United States Patent [19]

Stobbie, IV et al.

[11] Patent Number: 5,288,359
[45] Date of Patent: Feb. 22, 1994

[54] METHOD FOR ADHESIVELY BONDING CLOSE FITTING COMPONENTS

[75] Inventors: Charles W. Stobbie, IV, Maplewood; Walter C. Pearson; Gerald W. Quinn, both of St. Paul, all of Minn.

[73] Assignee: Minnesota Mining and Manufacturing Company, St. Paul, Minn.

[21] Appl. No.: 927,125

[22] Filed: Aug. 7, 1992

[51] Int. Cl.$^5$ .................. A63B 53/14; B29C 63/22; B29C 65/40
[52] U.S. Cl. .................. 156/294; 16/DIG. 12; 43/23; 273/81 R; 156/331.7; 156/324.4
[58] Field of Search .............. 156/293, 294, 331.7, 156/334, 575, 324.4; 16/DIG. 12, DIG. 19; 74/551.9; 81/489; 273/75, 81 R, 81 D, 81 B, 81.4, DIG. 8; 43/22, 18.1, 23

[56] References Cited

U.S. PATENT DOCUMENTS

| | | | |
|---|---|---|---|
| 2,718,485 | 9/1955 | Samuely | 156/91 |
| 4,775,719 | 10/1988 | Markevka et al. | 525/125 |
| 4,785,495 | 11/1988 | Dellis | 74/551.9 |
| 4,814,413 | 3/1989 | Thibaut et al. | 528/80 |
| 4,855,382 | 12/1989 | Vanhaeren | 528/45 |
| 4,885,331 | 12/1989 | Annighofer et al. | 524/440 |
| 4,984,949 | 1/1991 | Reckziegel | 412/8 |
| 4,999,407 | 3/1991 | Gilch et al. | 525/457 |
| 5,137,984 | 8/1992 | Kangas et al. | 525/411 |
| 5,155,878 | 10/1992 | Dellis | 74/551.9 |

OTHER PUBLICATIONS

Encyclopedia of Polymer Science and Engineering, 1985, pp. 548, 549, 564.
1990 Hot Melt Symposium, 1990, pp. 109-113.
1988 Hot Melt Symposium, 1988, pp. 55-58, 89-95.
"Shaping Reactive Hot Melts Using LMW Copolyesters", Adhesives Age, Nov. 1987, pp. 32-35.
Shields, *Adhesives Handbook*, CRC Press, 1970, pp. 28, 29, 46-48, 136-139, 258-260.

*Primary Examiner*—Michael W. Ball
*Assistant Examiner*—Steven D. Maki
*Attorney, Agent, or Firm*—Gary L. Griswold; Walter N. Kirn; Steven E. Skolnick

[57] ABSTRACT

A method for adhesively bonding an at least partially hollow first member to a second member received interiorly of the first member. Adhesive is applied to the second member and allowed to attain a substantially nonflowable condition. The first and second members are positioned such that the first member at least partially overlies the nonflowable adhesive on the second member. The adhesive is reactivated and then cooled to adhesively bond the first and second members together. An adhesive dispenser for applying the adhesive to the second member is also disclosed.

9 Claims, 3 Drawing Sheets

1

METHOD FOR ADHESIVELY BONDING CLOSE FITTING COMPONENTS

BACKGROUND OF THE INVENTION

1. Field of the Invention

This invention relates to a method for adhesively bonding close fitting components, such as the mounting of a tubular sleeve, sheath, cover or grip over a cylindrical shaft, core or rod. The invention also relates to an applicator that is especially useful in practicing this method.

2. Description of the Related Art

There are many products for which a slip-resistant or cushioned grip is extremely desirable. Fishing rods, golf clubs, garden tools, and tennis and badminton rackets, to name a few, all benefit from having such grips around what would otherwise be a smooth and perhaps slippery shaft. At one time such grips were provided by adhering a spiraled leather strip at the desired location.

More recently it has been customary to secure a spiraled strip of pressure-sensitive adhesive transfer tape about the shaft, remove the tape's temporary carrier to expose the adhesive, render the adhesive temporarily slippery by applying an organic solvent, and slide the resilient grip over the adhesive. The solvent gradually evaporates to provide a strong adhesive bond between the grip and the shaft. This process is not only tedious and expensive, but releases environmentally undesirable organic solvent vapors into the atmosphere.

In an alternative approach, solvent-based adhesives and two-part structural adhesives have been applied to the shaft and the resilient grip slid over the "wet" adhesive. While fairly simple, adhesive that is "squeezed out" when the close fitting grip is positioned must be removed thereby wasting the adhesive. Moreover, organic vapors are released into the atmosphere when solvent-based adhesives are used.

SUMMARY OF THE INVENTION

This invention relates to a method for adhesively bonding an at least partially hollow first member to a second member which is received interiorly of the first member. The method comprises the steps of:

(a) applying an adhesive to the second member;
(b) allowing the adhesive to attain a substantially nonflowable condition;
(c) positioning the first and second members such that at least a portion of the second member is received within the interior of the first member, the first member at least partially overlying the nonflowable adhesive;
(d) reactivating the adhesive; and
(e) cooling the reactivated adhesive to adhesively bond the first and second members together.

The adhesive may be applied to the second member by extrusion, coating, spraying, dipping or rubbing. Preferably, the adhesive is a hot-melt adhesive of either the reactive (e.g., moisture curable) or the nonreactive type. The adhesive may be cooled to a solid state to attain a substantially nonflowable condition but may be subsequently reactivated by heating.

The method is particularly advantageous for bonding close fitting components such as the placement of a resilient hand grip on the shaft of an item of sports equipment such as a golf club or a fishing rod.

The invention also relates to an adhesive dispenser useful for applying the adhesive to the second member.

The dispenser comprises a die which, in turn, may comprise a series of alternating grooves and ridges formed on an interior surface of the die, and an adhesive receiving channel which surrounds the grooves and ridges for distributing a supply of the adhesive to the same. The series of alternating grooves and ridges is optional. The die may also include an additional slot in which is received a flexible, resilient member, the diameter of which can responsively change to accommodate a tapered shaft.

The dispenser may further comprise an adhesive receptacle for retaining a supply of the adhesive and a conduit between the receptacle and the die for transferring the adhesive from the receptacle to the die. The dispenser may further comprise means for melting the adhesive before it is applied to the second surface.

BRIEF DESCRIPTION OF THE DRAWINGS

The invention will be more fully appreciated with reference to the following drawings in which similar reference numerals designate the same or analogous components throughout and in which.

DETAILED DESCRIPTION OF THE PREFERRED EMBODIMENTS

Figure 1:
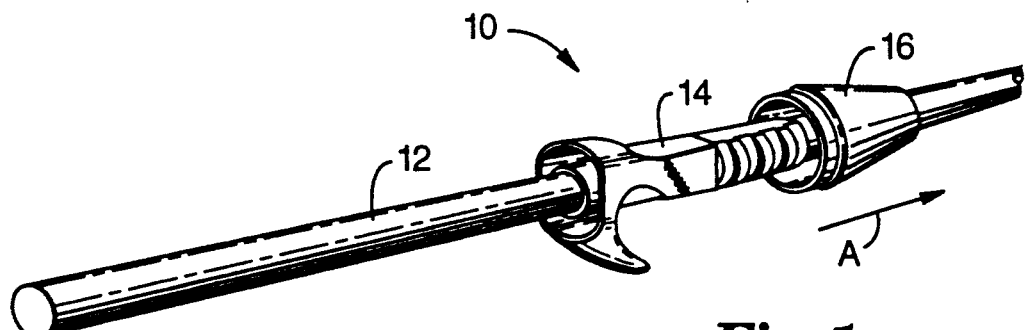
FIGS. 1 to 5 illustrate successive steps of a method according to the invention and, in particular, the mounting of a hand grip over a fishing rod shaft.

Turning now to the drawings, FIGS. 1 to 5 sequentially illustrate the several steps of a method for adhesively bonding close fitting components according to the invention. FIG. 1 shows a fishing rod 10 which comprises a shaft 12, to which is mounted a reel seat 14 and a locking ring 16, between which a reel (not shown separately in the drawings) would be secured. In preparing to mount a grip 18 (FIG. 5) on shaft 12, both reel seat 14 and locking ring 16 are moved in the direction of arrow A (FIG. 1) toward the tip end of the shaft to expose sufficient area for adhesive application, as explained more fully below.

Figure 2:
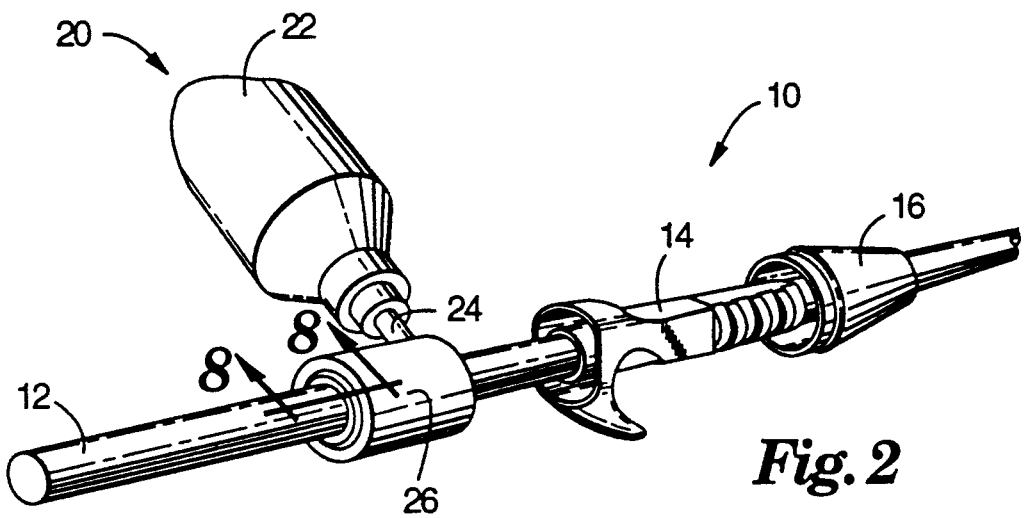
Figure 3:
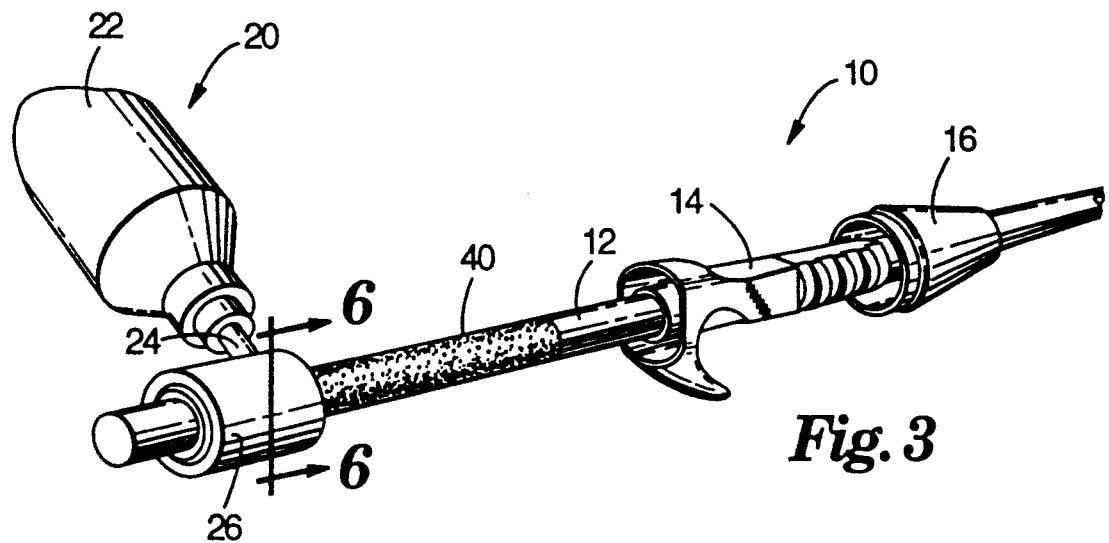
Figure 6:
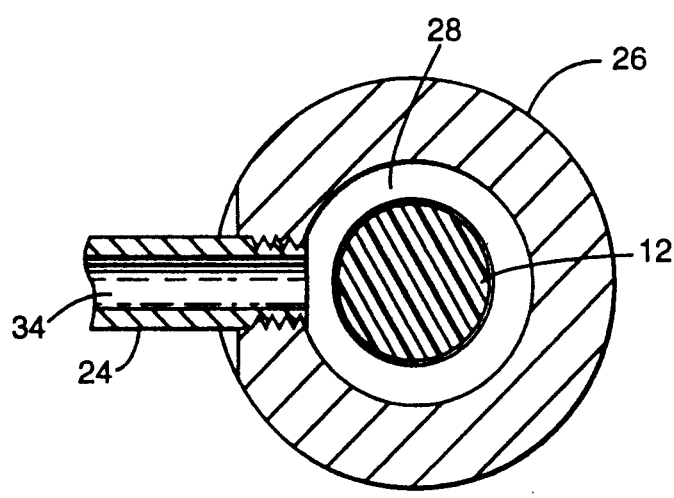
FIG. 6 is an enlarged cross-sectional view of an applicator useful in the method of FIGS. 1 to 5 and taken along lines 6—6 of FIG. 3.
Figure 7:
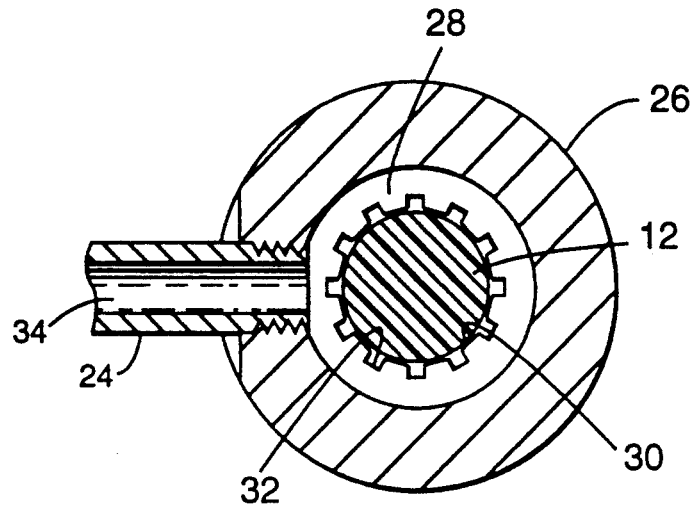
FIG. 7 is an enlarged cross-sectional view similar to FIG. 6 but showing an alternative embodiment of an applicator useful in the method of FIGS. 1 to 5.

With reference to FIGS. 2 and 3, an adhesive dispenser 20 useful in practicing the inventive method comprises a barrel or adhesive receptacle 22 and a conduit or nozzle 24 secured to an adhesive applicator die 26. As best shown in FIG. 6, nozzle 24 threadably penetrates applicator die 26 to an interior portion thereof. The die is a generally tubular member which includes a circumferential adhesive-receiving channel 28. Optionally, and as best shown in FIG. 7, adhesive receiving channel 28 may surround a series of longitudinally extending, alternating ridges 30 and grooves 32 that are formed on an interior surface of the tubular die. In either embodiment, channel 28 is in fluid communication with an adhesive passageway 34 through nozzle 24.

Figure 8:
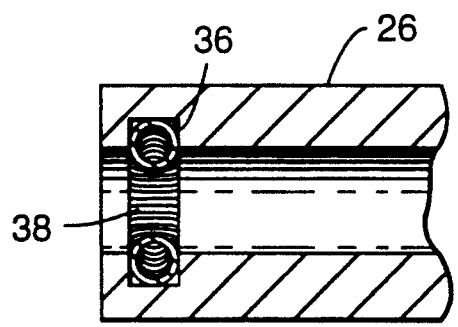
FIG. 8 is an enlarged sectional view of an optional feature of an applicator useful in the method of FIGS. 1 to 5 and taken along lines 8—8 of FIG. 2.

As shown in FIG. 8, applicator die 26 may further include means for evenly spreading the adhesive onto the shaft. As explained below, this construction is particularly useful in coating tapered shafts. More specifically, die 26 may further comprise a circumferential slot 36 in which is received a flexible, resilient member 38 such as biasing means, (for example, a garter spring), an O-ring or a seal. Flexible member 38 typically has an inside diameter that is smaller than that of the applicator die. Slot 36 and flexible member 38 are optional and may be used in conjunction with applicator dies of the type shown in FIGS. 6 and 7. (In FIG. 8, shaft 12 is not shown so as to facilitate understanding of the drawing.)

Referring again to FIGS. 2 and 3, shaft 12, which is to be coated with adhesive, is inserted longitudinally through the interior of applicator die 26 and positioned adjacent reel seat 14. With additional reference to FIGS. 6 and 7, adhesive dispenser 20 is activated to force adhesive from receptacle 22 through adhesive passageway 34 of nozzle 24 into adhesive receiving channel 28. The adhesive flows circumferentially and is extruded as an adhesive pattern 40 on the shaft. In the case of the applicator die of FIG. 7, adhesive pattern 40 comprises a series of longitundially extending adhesive stripes (corresponding to ridges 30 and grooves 32). When an adhesive pattern of sufficient length has been deposited, dispenser 20 is deactivated and shaft 12 removed from the interior of the applicator die.

In the case of a tapered shaft the adhesive spreading means of FIG. 8 is particularly useful. As applicator die 26 is reciprocated longitudinally relative to shaft 12, the shaft contacts flexible member 38. As the diameter of shaft 12 increases, flexible member 38 is circumferentially expanded into slot 36 but remains in contact with the shaft, thereby evenly distributing the adhesive along the shaft. The inside diameter of flexible member 38 (when unexpanded) should approximate the smallest diameter portion of shaft 12 that requires adhesive.

As explained more fully below, adhesives used in the practice of the invention may be of the type that are applied from dispenser 20 in molten form and rapidly cool to ambient temperature and solidify to a substantially nonflowable condition. By "a substantially nonflowable condition" it is meant that there is no appreciable adhesive transfer to a second surface (such as a spatula, a tongue depressor or the first member) which contacts the adhesive. Alternatively, some crystalline hot melt adhesives change from a clear state to an opaque, hazy, milky white state upon solidifying to a substantially nonflowable condition.

Figure 4:
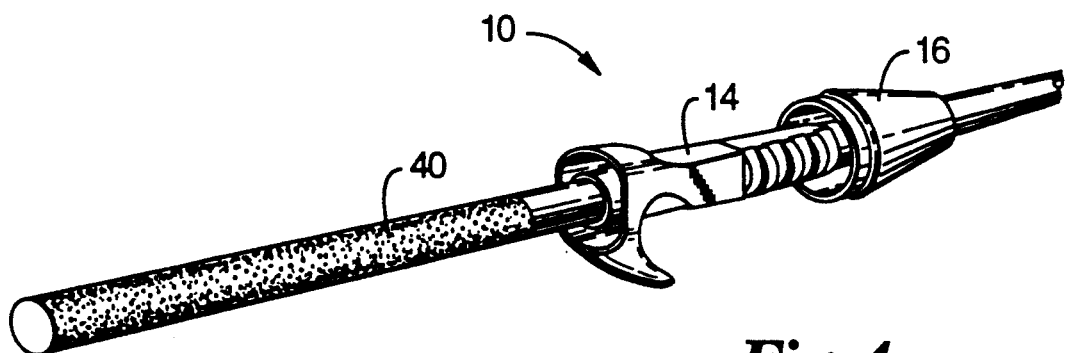
Figure 5:
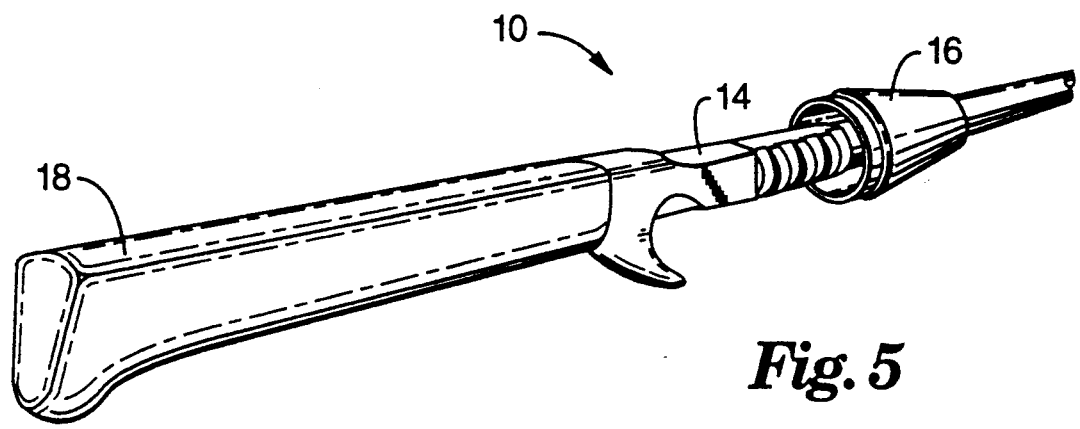

The adhesive is allowed to attain a substantially nonflowable condition by cooling. Once the adhesive has so cooled, and as shown in FIG. 4, reel seat 14 can be slid over adhesive pattern 40 to a position proximate its final location. Alternatively, depending on the relative dimensions of the reel seat and the shaft, the reel seat may be positioned before the adhesive has attained a substantially nonflowable condition. Grip 18 may then be slipped over the adhesive such that it remains in place without being permanently bonded to shaft 12 as shown in FIG. 5.

The assembly comprising adhesive-coated shaft 12 and grip 18 is then heated, for example by induction heating, dielectric heating or radio frequency heating, or by placing it in a thermal or microwave oven, or by any other convenient heating means, to reactivate (i.e., remelt) the adhesive and to thoroughly wet both the interior of grip 18 and the exterior of shaft 12. While the adhesive is molten following reactivation, grip 18 and reel seat 14 may be finally positioned. The assembly is allowed to cool to ambient temperature, thereby resolidifying the adhesive and firmly bonding grip 18 and reel seat 14 to shaft 12.

Because the adhesive may be conveniently applied from dispenser 20 in molten form, the dispenser may include means for melting the otherwise solid adhesive. Such means may include an electrically or battery heated well or chamber. The adhesive may be pneumatically supplied to the heated chamber from a cartridge containing the solid adhesive. The adhesive could also be delivered by way of a pail or drum unloader. Alternatively, the adhesive may be in the form of a relatively rigid rod or stick which can be manually or mechanically driven into the heated well. Other related techniques for supplying adhesive may be apparent to those skilled in the art.

Although the invention has been described in conjunction with a particular applicator die, the adhesive may be applied to shaft 12 by other techniques such as dipping, spraying or roll coating. Also, the adhesive may be supplied as a rod or stick which can be manually rubbed against the shaft to deposit an adhesive layer thereon. Such an adhesive may be regarded as a "hot melt adhesive" as that expression is used herein since the frictional forces associated with rubbing the adhesive stick against the shaft can generate sufficient heat to melt the adhesive and to cause a layer thereof to be deposited on the shaft.

A wide variety of hot melt adhesives of both the nonreactive and the reactive type may be used in the practice of the invention. Nonreactive hot melt adhesives typically comprise one or more base polymers in conjunction with one or more tackifying resins. The base polymer provides the backbone of the adhesive, imparting strength and toughness. Typical base polymers for nonreactive hot melt adhesives include polyolefins, ethylene copolymers and terpolymers, polyesters, polyamides, polyesteramides, polyurethanes, and combinations thereof.

The tackifying resin generally increases adhesion, but may be selected to tailor the viscosity, set time or open time of the adhesive as well as to reduce cost. Typical tackifiers include natural resins, synthetic resins or combinations thereof. Natural resins include polyterpenes, rosins, rosin esters and derivatives, as well as their hydrogenated forms. Synthetic petroleum resins may be employed, including products obtained by thermal or catalytic polymerization of aliphatic or cycloaliphatic olefins, aromatic hydrocarbons, hydrogenated derivatives thereof, and blends of selected resins. For example, aliphatic resins may be obtained by polymerizing C5 naptha fractions containing C5 conjugated diolefins such as isoprene, 1,3-pentadiene, mixtures of diolefins or mixtures with cyclopentadiene, methyl cyclopentadiene, etc. If desired, such resins may be hydrogenated. The so-called aromatic resins may be obtained by polymerizing a petroleum fraction containing polymerizable aromatic hydrocarbons such as styrene, alpha-methyl indene and, if desired, hydrogenating them. The resins may be chemically modified with unsaturated acids or acid anhydrides. Examples include mixed aliphatic-/aromatic resins and phenolic-modified terpene resins. The suitability of a particular tackifying resin depends on its compatibility with the base polymer and, to a lesser extent, its compatibility with other components in the adhesive.

Various additives such as antioxidants, fillers and plasticizers may be included to enhance certain properties. Petroleum waxes are a popular and conventional additive which are included to reduce melt viscosity, decrease cost and adjust set time. Useful waxes include hard, brittle, crystalline, saturated straight chain hydrocarbon paraffin waxes, microcrystalline waxes and microwaxes.

Reactive hot melt adhesives are preferred. Such adhesives are applied in molten form and subsequently cure to a solid, infusible, insoluble, crosslinked state upon reaction with ambient moisture or a reactive species generated by heating the adhesive above the dispensing temperature. Prior to curing, reactive hot melt adhesives may be reactivated. Reactive hot melt adhesives afford rapid green strength build up (i.e, the bonded components can be quickly handled without the aid of clamps) and ultimately cure to provide a high strength bond. Useful moisture curable (i.e., reactive) hot melt adhesives may be derived from silane-based silicone polymers and isocyanate-terminated polyurethane prepolymers. The latter are preferred because they cure faster and yield stronger bonds.

Isocyanate-terminated polyurethane prepolymers comprise the reaction product of a diisocyanate and a hydroxy group containing material. Useful diisocyanates include toluene diisocyanate (TDI) and diphenyl methane -4,4'-diisocyanate (MDI). Useful hydroxy group containing materials include polyether polyols, polyester polyols, polyetherester polyols, and polycaprolactones. Suitable moisture-curable hot melt adhesives are exemplified in U.S. Pat. Nos. 4,775,719, 4,814,413, 4,984,949 and 4,999,407. When moisture-curable hot melt adhesives are used with coating die 26 or the like, it may be desirable to plug the open ends of the die and to fill the die interior with uncured adhesive after the coating step has been completed, thereby preventing residual adhesive in the die from curing.

A presently preferred moisture-curable hot melt adhesive is an isocyanate-terminated polyurethane prepolymer based on polyhexamethylene adipate and MDI and/or TDI. (Optionally, the adhesive may comprise one or more other moisture curable isocyanate-terminated polyurethane prepolymers.) This adhesive becomes a viscous fluid when heated, can be extruded at about 120° C., and is conveniently reactivated at about 70° C. After the adhesive cools to room temperature, it cures with ambient moisture (e.g., humidity). The amount of time to achieve full strength (about 20,000–30,000 kPa) will vary depending on ambient humidity, temperature and adhesive thickness.

Useful heat-activated curing hot melt adhesives are exemplified in U.S. Pat. Nos. 4,855,382 and 4,885,331.

Where an especially tight fitting grip is desired (e.g., when a resilient hand grip is fitted onto a golf club shaft), the inner diameter thereof will more closely approximate the diameter of the shaft. In order to facilitate sliding the grip over the shaft, it may be helpful to first apply a thin layer of a lubricant such as water or a hydroxy compound (for example, polypropylene oxide glycol) to the surface of the adhesive, rendering it more slippery. The lubricant should be compatible with the sleeve and the adhesive to avoid unnecessary environmental contamination. The lubricant should not materially adversely affect the adhesive qualities of the adhesive.

The particular adhesive formulation will be determined by its intended application. For example, if the adhesive will be used to attach a grip to the shaft of a golf club, it must be reactivatable at a temperature low enough to avoid damaging the shaft and the grip. If a lubricant is used to assist in mounting the grip, it must be compatible with the adhesive.

Although the invention has been described as having particular utility in the assembly of sports equipment such as fishing rods and golf clubs, the invention is not so limited. The invention offers advantages generally in the bonding of an at least partially open, hollow or tubular first member, such as a sheath, sleeve, cover or grip over a second member, such as a core, rod, shaft or the like, wherein the second member is received interiorly of the first member and in a close fitting relationship thereto. By "close fitting" it is meant that even in the absence of adhesive there would be some physical contact between the first and second members when they are assembled.

The second member may be hollow or solid, elongated or not, and may have a circular, oval, triangular or other polygonal shape, or an asymmetrical shape in cross-section. It may be formed of metal, plastic, ceramic, glass or cellulosic materials. Similarly, the first member may assume a wide variety of shapes and configurations and may be formed from most any material. While it is preferred that the first member have a cross-sectional shape which complements that of the second member, such is not required. By necessity, the first member must be at least partially open or hollow such that the second member may be received interiorly thereof although the first member need not be circumferentially continuous.

Reasonable variations or modifications are possible within the scope of the foregoing specification and drawings without departing from the spirit of the invention, which is defined in the accompanying claims.

The embodiment for which an exclusive property or privilege is claimed are defined as follows:

1. A method for adhesively bonding an at least partially hollow first member to a second member received interiorly of the first member, the method of comprising the steps of:
   (a) applying a moisture curable hot melt adhesive to the second member;
   (b) allowing the adhesive to attain a substantially nonflowable condition;
   (c) positioning the first member and the second member such that at least a portion of the second member is received interiorly of the first member whereby at least a portion of the first member at least partially overlies the substantially nonflowable adhesive;
   (d) reactivating the substantially nonflowable adhesive; and
   (e) cooling the reactivated adhesive to adhesively bond the first and second members together.

2. A method according to claim 1 wherein the adhesive is applied to the second member by extrusion, coating, spraying, dipping and rubbing.

3. A method according to claim 1 wherein the adhesive attains the substantially nonflowable condition by cooling to a solid state.

4. A method according to claim 1 wherein the adhesive is reactivated by heating.

5. A method according to claim 1 wherein the moisture curable hot melt adhesive includes an isocyanate terminated polyurethane prepolymer which comprises the reaction product of a diisocyanate and polyhexamethylene adipate.

6. A method according to claim 1 wherein the second member is substantially circular in cross-section and the first member is circumferentially continuous.

7. A method according to claim 1 wherein the first member is a resilient hand grip and the second member is the shaft of an item of sports equipment.

8. A method according to claim 7 wherein the second member forms at least a portion of the shaft of a golf club.

9. A method according to claim 7 wherein the second member forms at least a portion of the shaft of a fishing rod.

* * * * *